United States Patent
Zhao (10) Patent No.: US 12,538,166 B2
(45) Date of Patent: Jan. 27, 2026

(54) METHOD FOR RESOURCE CONFIGURATION, TERMINAL DEVICE AND STORAGE MEDIUM

(71) Applicant: DATANG MOBILE COMMUNICATIONS EQUIPMENT CO., LTD., Beijing (CN)

(72) Inventor: Yali Zhao, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 332 days.

(21) Appl. No.: 18/263,250

(22) PCT Filed: Jan. 18, 2022

(86) PCT No.: PCT/CN2022/072509
§ 371 (c)(1),
(2) Date: Jul. 27, 2023

(87) PCT Pub. No.: WO2022/161210
PCT Pub. Date: Aug. 4, 2022

(65) Prior Publication Data
US 2024/0089792 A1    Mar. 14, 2024

(30) Foreign Application Priority Data

Jan. 29, 2021  (CN) .......................... 202110133444.2

(51) Int. Cl.
*H04W 28/02*     (2009.01)
*H04W 72/231*    (2023.01)
*H04W 84/06*     (2009.01)

(52) U.S. Cl.
CPC ..... *H04W 28/0278* (2013.01); *H04W 72/231* (2023.01); *H04W 84/06* (2013.01)

(58) Field of Classification Search
None
See application file for complete search history.

(56) References Cited

U.S. PATENT DOCUMENTS 10,856,174 B2    12/2020  Babaei et al.
12,160,886 B2 *  12/2024  Wu ........................ H04W 74/08
(Continued)

FOREIGN PATENT DOCUMENTS

CN    104780569 A    7/2015
CN    106506061 A    3/2017
(Continued)

OTHER PUBLICATIONS

Notice of the third review opinion issued Jan. 10, 2025 for Chinese Application No. 202110133444.2.
(Continued)

*Primary Examiner* — Clemence S Han
(74) *Attorney, Agent, or Firm* — Harness, Dickey & Pierce, P.L.C.

(57) ABSTRACT

A method for resource configuration, performed by a terminal device, includes: determining a first mapping relationship between a first target identifier and a second target identifier, in which the first target identifier includes at least one of: a Quality of Service (QoS) parameter identifier, a logical channel identifier or a bearer identifier; and the second target identifier includes at least one of: a cell type identifier or a cell identifier list; and performing a buffer status report (BSR) and/or an uplink resource allocation based on the first mapping relationship.

17 Claims, 4 Drawing Sheets

(56) References Cited

U.S. PATENT DOCUMENTS

| | | | |
|---|---|---|---|
| 2018/0368133 A1 | 12/2018 | Park et al. | |
| 2019/0053199 A1* | 2/2019 | Fujishiro | H04W 76/11 |
| 2019/0230565 A1* | 7/2019 | Han | H04W 72/0453 |
| 2020/0178135 A1* | 6/2020 | Yun | H04W 36/0061 |
| 2020/0187220 A1* | 6/2020 | Xiao | H04W 72/0453 |
| 2020/0260404 A1 | 8/2020 | Vrind et al. | |
| 2020/0337110 A1* | 10/2020 | Kim | H04W 76/28 |
| 2021/0352525 A1* | 11/2021 | Hong | H04L 1/1614 |
| 2022/0124794 A1* | 4/2022 | Wu | H04W 74/0833 |
| 2022/0377829 A1* | 11/2022 | Kim | H04W 80/02 |

FOREIGN PATENT DOCUMENTS

| | | |
|---|---|---|
| CN | 107295562 A | 10/2017 |
| CN | 109392175 A | 2/2019 |
| CN | 110312285 A | 10/2019 |
| CN | 110838899 A | 2/2020 |
| CN | 110972257 A | 4/2020 |
| CN | 111417211 A | 7/2020 |
| WO | 2018141253 A1 | 8/2018 |
| WO | 2019085741 A1 | 5/2019 |
| WO | 2020/035045 A1 | 2/2020 |
| WO | 2020200261 A1 | 10/2020 |

OTHER PUBLICATIONS

International Search Report and Written Opinion issued Apr. 11, 2022 in International Application No. PCT/CN2022/072509.
RP_2019, Apr. 7, 2020.
Ericsson, "NTN location reporting and network identifiers," 3GPP TSG-RAN WG2 Meeting #113, R2-2100348, Jan. 25, 2021.
First Office Action issued Aug. 21, 2024 for CN application 202110133444.2.
Second OA Office Action issued Oct. 15, 2024 for CN application 202110133444.2.
Extended Search Report for European application 22745086.3 issued May 14, 2024.

* cited by examiner

METHOD FOR RESOURCE CONFIGURATION, TERMINAL DEVICE AND STORAGE MEDIUM

CROSS-REFERENCE TO RELATED APPLICATION

This application is a national phase of International Application No. PCT/CN2022/072509 filed on Jan. 18, 2022 which claims priority to Patent Application No. 202110133444.2 filed on Jan. 29, 2021 in the People's Republic of China, the entire content of each of which are incorporated herein by reference.

TECHNICAL FIELD

The disclosure relates to the field of mobile communication technologies, and specifically to, a method for resource configuration, a terminal device and a storage medium.

BACKGROUND

Space-earth integration communication is a development direction in a future mobile communication system. In order to support space-earth integration, a future terminal may access different types of cells simultaneously, for example, access a terrestrial cell and a satellite cell simultaneously or access different types of satellite cells simultaneously.

SUMMARY

According to a first aspect of the disclosure, a method for resource configuration is provided. The method for resource configuration is applicable to a terminal device. The method includes: determining a first mapping relationship between a first target identifier and a second target identifier, in which the first target identifier includes at least one of: a Quality of Service (QoS) parameter identifier, a logical channel identifier or a bearer identifier; and the second target identifier includes at least one of: a cell type identifier or a cell identifier list; and performing a buffer status report (BSR) and/or an uplink resource allocation based on the first mapping relationship.

According to another aspect of the disclosure, a terminal device is provided. The terminal device includes: a memory, a transceiver and a processor.

The memory is configured to store a computer program.

The transceiver is configured to transmit and receive data under a control of the processor.

The processor is configured to read the computer program stored in the memory and perform operations of:
- determining a first mapping relationship between a first target identifier and a second target identifier, in which the first target identifier includes at least one of: a QoS parameter identifier, a logical channel identifier or a bearer identifier; and the second target identifier includes at least one of: a cell type identifier or a cell identifier list; and
- performing a BSR and/or an uplink resource allocation based on the first mapping relationship.

According to another aspect of the disclosure, a non-transitory processor-readable storage medium stored with a computer program is provided, in which the computer program is configured to cause a processor to perform the method for resource configuration as described above.

BRIEF DESCRIPTION OF THE DRAWINGS

The drawings are intended to better understand solutions and do not constitute a limitation to the disclosure.

DETAILED DESCRIPTION

In embodiments of the disclosure, the term "and/or" may describe association relationships of associated objects, indicating that there may be three types of relationships, for example, A and/or B, which may mean: A exists alone, A and B exist at the same time, and B exists alone. The character "/" generally indicates that the associated objects before and after are in an "or" relationship.

The term "plurality" or "multiple" in embodiments of the disclosure may refer to two or more, which is similar to other quantifiers.

The technical solutions in embodiments of the disclosure will be described clearly and completely in combination with the appended drawings in embodiments of the disclosure. It is obvious that the embodiments described are only part of embodiments in the disclosure, rather than all embodiments. On the basis of the embodiments of the disclosure, all other embodiments obtained by those skilled in the art without creative work are within the protection scope of the disclosure.

A method and an apparatus for resource configuration, a device and a storage medium are provided in embodiments of the disclosure, to satisfy requirements for resource allocation in a multi-connection scenario.

The method for resource configuration in embodiments of the disclosure is applicable to a terminal device side. The terminal device referred in embodiments of the disclosure may refer to a device that provides voice and/or data connectivity to a user, a handheld device with a radio connection function or other processing devices connected to a radio modem. In different systems, the name of the terminal device may be different. For example, the terminal device may be referred to a user equipment (UE) in a fifth generation (5G) system. The radio terminal device may communicate with one or more core networks via a radio access network (RAN).

The radio terminal device may be a mobile terminal device, for example, a mobile phone (or referred to as a cellular phone) and a computer having a mobile terminal device such as a portable, compact, handheld, computer built-in or vehicle-mounted mobile apparatus, which may exchange voice and/or data with a radio access network. For example, the device may be a personal communication service (PCS) phone, a cordless telephone, a session initiated protocol (SIP) phone, a wireless local loop (WLL) station, a personal digital assistant (PDA) and the like. The radio terminal device may also be referred to as a remote terminal, an access terminal and a user terminal, which is not limited in the embodiments of the disclosure.

In the disclosure, the satellite cell in the following also refers to the non-terrestrial cell or the non-terrestrial network (NTN) cell. The non-terrestrial cell or the NTN cell may include a high-altitude platform, unmanned aerial vehicle (UAV), or the like.

Figure 1:
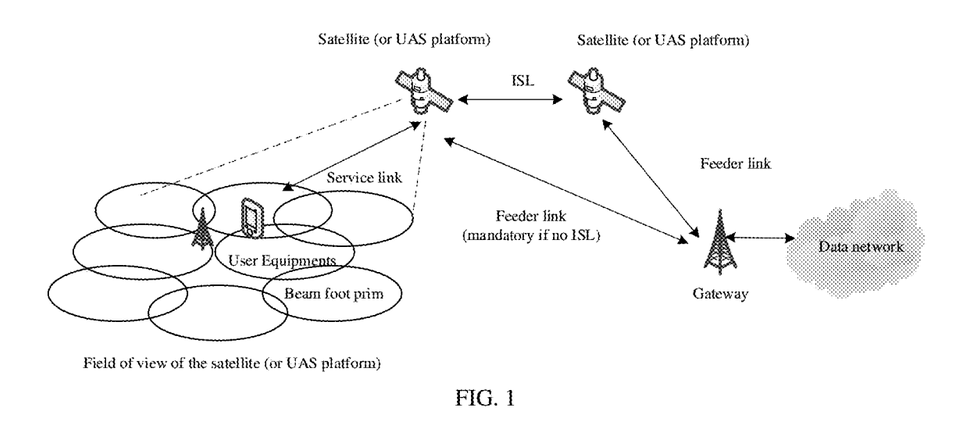
FIG. 1 is a diagram illustrating a satellite communication scenario according to a first embodiment of the disclosure.

In addition, a multi-connection scenario in embodiments of the disclosure may include that the terminal accesses different types of cells simultaneously. For example, the terminal accesses a terrestrial cell and a satellite cell/high-altitude platform simultaneously or accesses different types of satellite cells/high-altitude platforms simultaneously. In a communication scenario of the satellite cell/high-altitude platform, it refers to a system that forwards a communication signal by using a satellite or a high-altitude platform (such as an unmanned aerial vehicle (UAS)) as an intermediate node. The satellite/high-altitude platform communication system may provide a radio access service for the terminal. A typical schematic diagram of a satellite/high-altitude platform communication scenario is as follows. As illustrated in FIG. 1, the related links include: a service link, that is, a radio link between the terminal and the satellite/high-altitude platform, a feeder link, that is, a radio link between the satellite/high-altitude platform and a gateway station, and an inter-satellite link (ISL), that is, a link between the satellites/high-altitude platforms.

In addition, the satellites mentioned in the above embodiments include several types in Table 1.

TABLE 1

| Satellite Type | Altitude Range | Orbit |
| --- | --- | --- |
| LEO satellite | 300-1500 km | orbiting the earth, moving relative to the earth |
| MEO satellite | 7000-25000 km | |
| GEO satellite | 35786 km | An altitude/azimuth is fixed with respect to a specific earth reference point |
| UAS platform | 8-50 km (20 km for HAPS) | |
| HEO satellite | 400-50000 km | An elliptical orbit satellite with a low perigee and a very high apogee |

Figure 2:
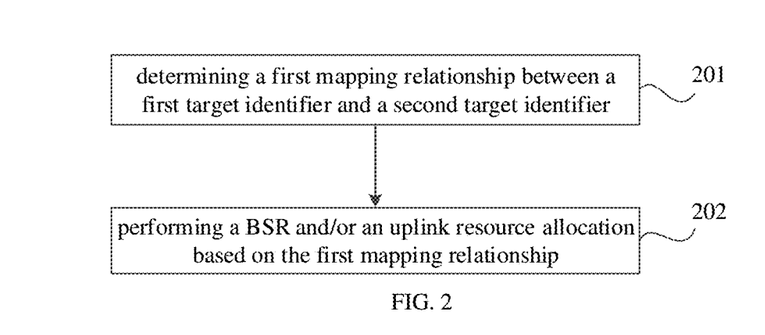
FIG. 2 is a flowchart illustrating a method for resource configuration according to a second embodiment of the disclosure.

FIG. 2 is a flowchart illustrating a method for resource configuration according to a first implementation solution of the disclosure. As illustrated in FIG. 2, the method for resource configuration includes step 201 and step 202.

At step 201, a first mapping relationship between a first target identifier and a second target identifier is determined.

In some embodiments, the first target identifier includes but not limited to at least one of: a Quality of Service (QoS) parameter identifier, a logical channel identifier or a bearer identifier.

In some embodiments, the second target identifier includes but not limited to at least one of: a cell type identifier or a cell identifier list.

In some embodiments of the disclosure, the cell type identifier includes at least one of: a terrestrial cell, a satellite cell, a low earth orbit (LEO) satellite cell, a medium earth orbit (MEO) satellite cell, a Geostationary earth orbit (GEO) satellite cell, a highly elliptical orbit (HEO) satellite cell or an unmanned aircraft systems (UAS) platform cell.

In different application scenarios, there may be one or more corresponding relationships between the first target identifier and the second target identifier included in the first mapping relationship. The corresponding relationship between the first target identifier and the second target identifier is illustrated by taking the QoS parameter identifier being 5QI and the cell type being the terrestrial cell or the satellite cell for an example. For example:

(1) The first mapping relationship includes a corresponding relationship between the QoS parameter identifier and the cell type identifier. For example, as illustrated in Table 2, the first target identifier is the QoS parameter identifier 5QI, and the second target identifier is the cell type of the terrestrial cell and the cell type of the satellite cell.

TABLE 2

| first target identifier | second target identifier |
| --- | --- |
| 5QI = 1, 2, 3 | terrestrial cell |
| 5QI = 4, 6 | satellite cell |
| 5QI = 5, 7 | satellite cell |

(2) The first mapping relationship includes a corresponding relationship between the QoS parameter identifier and the cell identifier list. For example, as illustrated in Table 3, the first target identifier is the QoS parameter identifier 5QI, and the second target identifier is the cell identifier list (cell list).

TABLE 3

| first target identifier | second target identifier |
| --- | --- |
| 5QI = 1, 2, 3 | Cell list 1 {Cell 1, Cell 2} |
| 5QI = 4, 6 | Cell list 2 {Cell 3, Cell 4} |
| 5QI = 5, 7 | Cell list 1 {Cell 1, Cell 2} |

(3) The first mapping relationship includes a corresponding relationship between the logical channel identifier and the cell type identifier. For example, as illustrated in Table 4, the first target identifier is the logical channel identifier (LCID), and the second target identifier is the cell type of the terrestrial cell and the cell type of the satellite cell.

TABLE 4

| first target identifier | second target identifier |
| --- | --- |
| LCID = 1 | terrestrial cell |
| LCID = 2 | satellite cell |
| LCID = 3 | satellite cell |

(4) The first mapping relationship includes a corresponding relationship between the LCID and the cell identifier list. For example, as illustrated in Table 5, the first target identifier is the LCID, and the second target identifier is the cell identifier list (cell list).

TABLE 5

| first target identifier | second target identifier |
| --- | --- |
| LCID = 1 | Cell list 1 { Cell 1, Cell 2} |
| LCID = 2 | Cell list 2 { Cell 3, Cell 4} |
| LCID = 3 | Cell list 1 { Cell 1, Cell 2} |

(5) The first mapping relationship includes a corresponding relationship between the bearer identifier and the cell type identifier. For example, as illustrated in Table 6, the first target identifier is the bearer identifier, and the second target identifier is the cell type of the terrestrial cell and the cell type of the satellite cell.

TABLE 6

| first target identifier | second target identifier |
|---|---|
| bearer identifier = 1 | terrestrial cell |
| bearer identifier = 2 | satellite cell |
| bearer identifier = 3 | satellite cell |

(6) The first mapping relationship includes a corresponding relationship between the bearer identifier and the cell identifier list. For example, as illustrated in Table 7, the first target identifier is the bearer identifier, and the second target identifier is the cell identifier list (cell list).

TABLE 7

| first target identifier | second target identifier |
|---|---|
| bearer identifier = 1 | Cell list 1 { Cell 1, Cell 2} |
| bearer identifier = 2 | Cell list 2 { Cell 3, Cell 4} |
| bearer identifier = 3 | Cell list 1 { Cell 1, Cell 2} |

At step 202, a buffer status report (BSR) and/or an uplink resource allocation is performed based on the first mapping relationship.

It may be understood that the first mapping relationship includes the first target identifier and the second target identifier that are needed in the multi-connection scenario. Therefore, the BSR and/or the uplink resource allocation may be performed based on the first mapping relationship.

In combination with a specific scenario, the BSR and/or the uplink resource allocation is performed based on the first mapping relationship.

Scenario One:

In the scenario, the BSR and/or the uplink resource allocation is performed based on the first mapping relationship. As illustrated in Table 8, the first mapping relationship includes the corresponding relationship between the LCID and the cell type identifier. In the embodiments, the first target identifier is the LCID, and the second target identifier is the cell type identifier, in which a cell type 1 is the terrestrial cell, and a cell type 2 is the satellite cell.

TABLE 8

| first target identifier | second target identifier |
|---|---|
| LCID = 1 | terrestrial cell |
| LCID = 2 | satellite cell |
| LCID = 3 | satellite cell |
| LCID = 4 | terrestrial cell |

Figure 3:
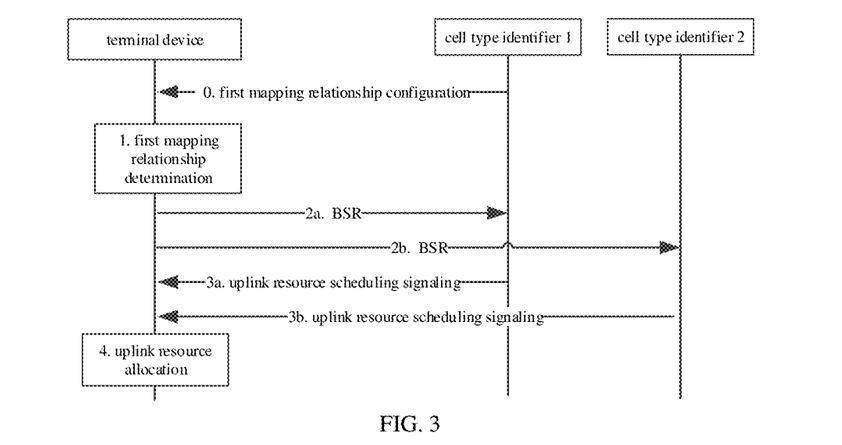
FIG. 3 is a diagram illustrating a resource configuration scenario according to a third embodiment of the disclosure.

In the embodiments, as illustrated FIG. 3, for logical channel identifiers with LCID=1 and LCID=4, their BSRs are reported to the terrestrial cell by taking the logical channel group (LCG) as a unit; and for logical channel identifiers with LCID=2 and LCID=3, their BSRs are reported to the satellite cell by taking the LCG as a unit. In addition, the terminal device also needs to consider the first mapping relationship between the first target identifier and the second target identifier when performing the uplink resource allocation. In detail, logical channel identifiers with LCID=1 and LCID=4 are only allowed to use uplink resources allocated by the terrestrial cell; and logical channel identifiers with LCID=2 and LCID=3 are only allowed to use uplink resources allocated by the satellite cell.

Scenario Two:

In the scenario, the BSR and/or the uplink resource allocation is performed based on the first mapping relationship. As illustrated in Table 9, the first mapping relationship includes the corresponding relationship between the LCID and the cell identifier list. In the embodiments, the first target identifier is the LCID, and the second target identifier is the cell identifier list, in which each cell identifier list is a list of a plurality of cell identifiers, and includes one or more cell identifiers that may be used by the LCID.

TABLE 9

| first target identifier | second target identifier |
|---|---|
| LCID = 1 | Cell list 1 { Cell 1, Cell 2} |
| LCID = 2 | Cell list 2 { Cell 3, Cell 4} |
| LCID = 3 | Cell list 2 { Cell 1, Cell 2} |
| LCID = 4 | Cell list 1 { Cell 3, Cell 4} |

Figure 4:
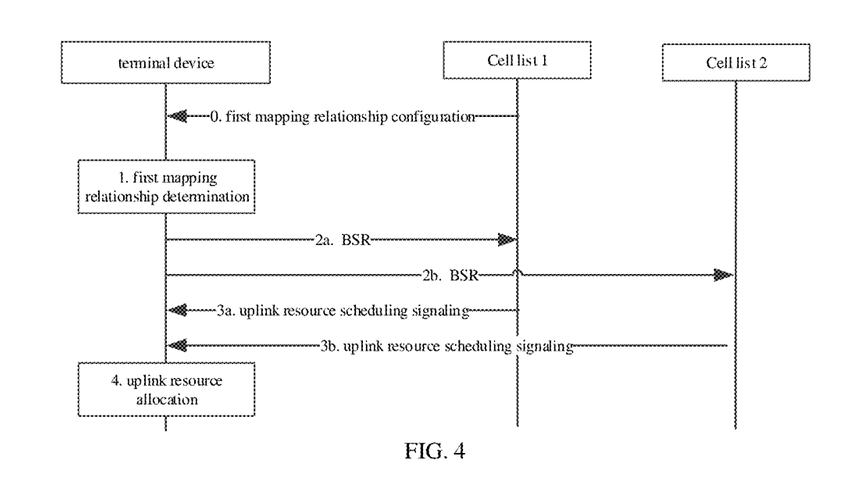
FIG. 4 is a diagram illustrating a resource configuration scenario according to a fourth embodiment of the disclosure.

In the embodiments, as illustrated FIG. 4, for logical channel identifiers with LCID=1 and LCID=4, their BSRs are reported to a cell corresponding to the cell list 1 by taking the LCG as a unit; and for logical channel identifiers with LCID=2 and LCID=3, their BSRs are reported to a cell corresponding to the cell list 2 by taking the LCG as a unit. In addition, the terminal device needs to consider the first mapping relationship between the first target identifier and the second target identifier when performing the uplink resource allocation. In detail, logical channel identifiers with LCID=1 and LCID=4 are only allowed to use uplink resources allocated by a cell in the cell list 1; and logical channel identifiers with LCID=2 and LCID=3 are only allowed to use uplink resources allocated by a cell in the cell list 2.

Scenario Three:

In the scenario, the BSR and/or the uplink resource allocation is performed based on the first mapping relationship. As illustrated in Table 10, the first mapping relationship includes the corresponding relationship between the QoS parameter identifier and the cell type identifier. In the embodiments, the first target identifier is the QoS parameter identifier, and the second target identifier is the cell type identifier, in which a cell type 1 is the terrestrial cell, and a cell type 2 is the satellite cell.

TABLE 10

| first target identifier | second target identifier |
|---|---|
| 5QI = 1, 2, 3 | terrestrial cell |
| 5QI = 4, 6 | satellite cell |

In an example, as illustrated FIG. 3, for the QoS parameter identifier with 5QI=1, 2, 3, its BSR may be reported to the terrestrial cell; and for the QoS parameter identifier with 5QI=4, 6, its BSR may be reported to the satellite cell. In addition, the terminal needs to consider the first mapping relationship between the first target identifier and the second target identifier when performing the uplink resource allocation. In detail, the QoS parameter identifier with 5QI=1, 2, 3 is only allowed to use uplink resources allocated by the terrestrial cell; and the logical channel identifier with 5QI=4, 6 is only allowed to use uplink resources allocated by the satellite cell.

Scenario Four:

In the scenario, the BSR and/or the uplink resource allocation is performed based on the first mapping relationship. As illustrated in Table 11, the first mapping relationship includes the corresponding relationship between the QoS parameter identifier and the cell identifier list.

In the embodiments, the first target identifier is the QoS parameter identifier, and the second target identifier is the cell identifier list. Each cell identifier list is a list of a plurality of cell identifiers, and includes one or more cell identifiers that may be used by the LCID.

TABLE 11

| first target identifier | second target identifier |
|---|---|
| 5QI = 1, 2, 3 | Cell list 1 { Cell 1, Cell 2} |
| 5QI = 4 | Cell list 2 { Cell 3, Cell 4} |
| 5QI = 6 | Cell list 2 { Cell 1, Cell 2} |

In the embodiments, as illustrated FIG. 4, for the QoS parameter identifier with 5QI=1, 2, 3, its BSR is reported to a cell corresponding to the cell list 1 by taking the LCG as a unit; for the QoS parameter identifier with 5QI=4, its BSR is reported to a cell corresponding to the cell list 2 by taking the LCG as a unit; and for the QoS parameter identifier with 5QI=6, its BSR is reported to a cell corresponding to the cell list 2 by taking the LCG as a unit. In addition, the terminal device needs to consider the first mapping relationship between the first target identifier and the second target identifier when performing the uplink resource allocation. In detail, the QoS parameter identifier with 5QI=1, 2, 3 is only allowed to use uplink resources allocated by a cell in the cell list 2; the QoS parameter identifier with 5QI=4 is only allowed to use uplink resources allocated by a cell in the cell list 2; and the QoS parameter identifier with 5QI=6 is only allowed to use uplink resources allocated by a cell in the cell list 2.

Scenario Five:

In the scenario, the BSR and/or the uplink resource allocation is performed based on the first mapping relationship. As illustrated in Table 12, the first mapping relationship includes the corresponding relationship between the bearer identifier and the cell type identifier. In the embodiments, the first target identifier is the bearer identifier, and the second target identifier is the cell type identifier. A cell type identifier 1 is the terrestrial cell, and a cell type identifier 2 is the satellite cell.

TABLE 12

| first target identifier | second target identifier |
|---|---|
| bearer identifier = 1 | terrestrial cell |
| bearer identifier = 2 | satellite cell |
| bearer identifier = 3 | satellite cell |
| bearer identifier = 4 | terrestrial cell |

In the embodiments, as illustrated FIG. 3, for bearer identifiers with bearer identifier=1 and bearer identifier=4, their BSRs are reported to the terrestrial cell by taking the LCG as a unit; and for bearer identifiers with bearer identifier=2 and bearer identifier=3, their BSRs are reported to the satellite cell by taking the LCG as a unit. In addition, the terminal device needs to consider the first mapping relationship between the first target identifier and the second target identifier when performing the uplink resource allocation. In detail, bearer identifiers with bearer identifier=1 and bearer identifier=4 are only allowed to use uplink resources allocated by the terrestrial cell; and bearer identifiers with bearer identifier=2 and bearer identifier=3 are only allowed to use uplink resources allocated by the satellite cell.

Scenario Six:

In the scenario, the BSR and/or the uplink resource allocation is performed based on the first mapping relationship. As illustrated in Table 13, the first mapping relationship includes the corresponding relationship between the bearer identifier and the cell identifier list. In the embodiments, the first target identifier is the bearer identifier, and the second target identifier includes the cell identifier list. Each cell identifier list is a list of a plurality of cell identifiers, and includes one or more cell identifiers that may be used by the LCID.

TABLE 13

| first target identifier | second target identifier |
|---|---|
| bearer identifier = 1 | Cell list 1 { Cell 1, Cell 2} |
| bearer identifier = 2 | Cell list 2 { Cell 3, Cell 4} |
| bearer identifier = 3 | Cell list 2 { Cell 1, Cell 2} |
| bearer identifier = 4 | Cell list 1 { Cell 3, Cell 4} |

In the embodiments, as illustrated FIG. 4, for bearer identifiers with bearer identifier=1 and bearer identifier=4, their BSRs are reported to a cell corresponding to the cell list 1 by taking the LCG as a unit; and for bearer identifiers with bearer identifier=2 and bearer identifier=3, their BSRs are reported to a cell corresponding to the cell list 2 by taking the LCG as a unit. In addition, the terminal device needs to consider the first mapping relationship between the first target identifier and the second target identifier when performing the uplink resource allocation. In detail, bearer identifiers with bearer identifier=1 and bearer identifier=4 are only allowed to use uplink resources allocated by a cell in the cell list 1; and bearer identifiers with bearer identifier=2 and bearer identifier=3 are only allowed to use uplink resources allocated by a cell in the cell list 2.

In summary, in the method for resource configuration in embodiments of the disclosure, the terminal device may determine the first mapping relationship between the first target identifier and the second target identifier; and perform the BSR and/or the uplink resource allocation according to the first mapping relationship. In the method, it may be ensured that different services of the terminal may be transmitted by selecting an appropriate cell type during radio transmission, thereby ensuring the QoS of the service better and improving the user experience.

In different application scenarios, ways for determining the first mapping relationship between the first target identifier and the second target identifier are different, and are illustrated in combination with different examples. A network device corresponding to a network side referred in the below embodiments may be a base station. The base station may include a plurality of cells that provide services for the terminal device. According to different specific application occasions, the base station may also be referred to as an access point, a device in an access network that communicates with a radio terminal device via one or more sectors on an air interface in the access network, or other names. The network device may be configured to replace a received air frame with an Internet Protocol (IP) packet as a router between a radio UE and a remainder of the access network. The remainder of the access network may include an IP communication network. The network device may further coordinate attribute management of the air interface. For example, the network device involved in embodiments of the disclosure may be a base transceiver station (BTS) in a global system for mobile communications (GSM) or code division multiple access (CDMA), or may be a network device (NodeB) in wide-band code division multiple access (WCDMA), or may be an evolutional Node B (eNB or e-NodeB) in a long term evolution (LTE) system, or may be a 5G base station (gNB) in a next generation system, or may be a home evolved Node B (HeNB), a relay node, a femto, and a pico, which is not limited in embodiments of the disclosure. In some network structures, the network device may include a centralized unit (CU) node and a distributed unit (DU) node that may also be geographically separated.

It is illustrated as follows:

Example One

In the example, the first mapping relationship between the first target identifier and the second target identifier is determined based on a preset protocol.

It may be understood that, in the embodiments, the first mapping relationship between the first target identifier and the second target identifier is specified based on a protocol. The first mapping relationship may refer to the above embodiments.

Example Two

In the example, a radio resource control (RRC) signaling or a media access control (MAC) signaling is received from a network side. The RRC signaling or the MAC signaling includes the first target identifier and the second target identifier corresponding to the first target identifier. Optionally, the first mapping relationship between the first target identifier and the second target identifier may be determined based on the RRC signaling or the MAC signaling.

In the example, the RRC signaling or the MAC signaling may include a logic channel identifier and a second target identifier corresponding to the logic channel identifier; a bearer identifier and a second target identifier corresponding to the bearer identifier; or a QoS parameter identifier and a second target identifier corresponding to the QoS parameter identifier.

In addition, when the terminal device performs the BSR and the uplink resource allocation based on the first mapping relationship, as illustrated in FIG. 3, the terminal device may determine the first mapping relationship between the first target identifier (for example, the logic channel identifier, the bearer identifier) and the second target identifier (for example, the cell type) based on the network allocation.

In the example, the network notifies the terminal of the first mapping relationship based on the RRC signaling or the MAC signaling. If the RRC signaling or the MAC signaling includes the logic channel identifier and the second target identifier corresponding to the logic channel identifier; or the bearer identifier and the second target identifier corresponding to the bearer identifier, taking the RRC signaling for an example, second identifier information may be carried in a logic channel (LCH) restriction corresponding to the logic channel identifier or the bearer identifier.

Example Three

In the example, a physical layer signaling is received from a network side. The physical layer signaling includes resource allocation information carrying the second target identifier and the first target identifier corresponding to the resource allocation information. For example, the logic channel identifier or the bearer identifier corresponds to the resource allocation information. Optionally, the first mapping relationship between the first target identifier and the second target identifier may be determined based on the received physical layer signaling.

It may also be understood that, in the example, the network side notifies the terminal device of the first mapping relationship between the first target identifier and the second target identifier based on the physical layer signaling.

It needs to be noted that the above three ways for determining the above three first mapping relationships are applicable to determining any one first mapping relationship. It is illustrated as follows:

(1) The first mapping relationship includes the corresponding relationship between the QoS parameter identifier and the cell type identifier.

In the example, the first mapping relationship between the QoS parameter identifier and the cell type identifier may be determined based on the preset protocol. Alternatively, an RRC signaling or an MAC signaling is received from a network side and the RRC signaling or the MAC signaling includes the QoS parameter identifier and the cell type identifier corresponding to the QoS parameter identifier. Alternatively, a physical layer signaling may be further received from a network side and the physical layer signaling includes resource allocation information carrying the cell type identifier and the QoS parameter identifier corresponding to the resource allocation information.

(2) The first mapping relationship includes the corresponding relationship between the QoS parameter identifier and the cell identifier list.

In the example, the first mapping relationship between the QoS parameter identifier and the cell identifier list may be determined based on the preset protocol. Alternatively, an RRC signaling or an MAC signaling is received from a network side and the RRC signaling or the MAC signaling includes the QoS parameter identifier and the cell identifier list corresponding to the QoS parameter identifier. Alternatively, a physical layer signaling may be further received from a network side and the physical layer signaling includes resource allocation information carrying the cell identifier list and the QoS parameter identifier corresponding to the resource allocation information.

(3) The first mapping relationship includes the corresponding relationship between the logical channel identifier (LCID) and the cell type identifier.

In the example, the first mapping relationship between the LCID and the cell type identifier may be determined based on the preset protocol. Alternatively, an RRC signaling or an MAC signaling is received from a network side and the RRC signaling or the MAC signaling includes the LCID and the cell type identifier corresponding to the LCID. Alternatively, a physical layer signaling may be further received from a network side and the physical layer signaling includes resource allocation information carrying the cell type identifier and the LCID corresponding to the resource allocation information.

(4) The first mapping relationship includes the corresponding relationship between the LCID and the cell identifier list.

In the example, the first mapping relationship between the LCID and the cell identifier list may be determined based on the preset protocol. Alternatively, an RRC signaling or an MAC signaling is received from a network side and the RRC signaling or the MAC signaling includes the LCID and the cell type identifier corresponding to the LCID. Alternatively, a physical layer signaling may be further received from a network side and the physical layer signaling includes resource allocation information carrying the cell identifier list and the LCID corresponding to the resource allocation information.

(5) The first mapping relationship includes the corresponding relationship between the bearer identifier and the cell type identifier.

In the example, the first mapping relationship between the bearer identifier and the cell type identifier may be determined based on the preset protocol. Alternatively, an RRC signaling or an MAC signaling may be further received from a network device and the RRC signaling or the MAC signaling includes the bearer identifier and the cell type identifier corresponding to the bearer identifier. Alternatively, a physical layer signaling may be further received from a network side and the physical layer signaling includes resource allocation information carrying the cell type identifier and the bearer identifier corresponding to the resource allocation information.

(6) The first mapping relationship includes the corresponding relationship between the bearer identifier and the cell identifier list.

In the example, the first mapping relationship between the bearer identifier and the cell identifier list may be determined based on the preset protocol. Alternatively, an RRC signaling or an MAC signaling may be further received from a network side and the RRC signaling or the MAC signaling includes the bearer identifier and the cell identifier list corresponding to the bearer identifier. Alternatively, a physical layer signaling may be further received from a network side and the physical layer signaling includes resource allocation information carrying the cell identifier list and the bearer identifier corresponding to the resource allocation information.

In summary, in the method for resource configuration in embodiments of the disclosure, the way for determining the first mapping relationship may be flexibly selected based on a scenario requirement, which ensures the practicability of the method for resource allocation.

Based on the above embodiments, in an actual execution process, there may be a scenario where a single first target identifier corresponds to a plurality of second target identifiers in the first mapping relationship. To ensure the normal communication, the corresponding relationship between the first target identifier and the second identifier needs to be further determined in a one-to-many scenario.

Figure 5:
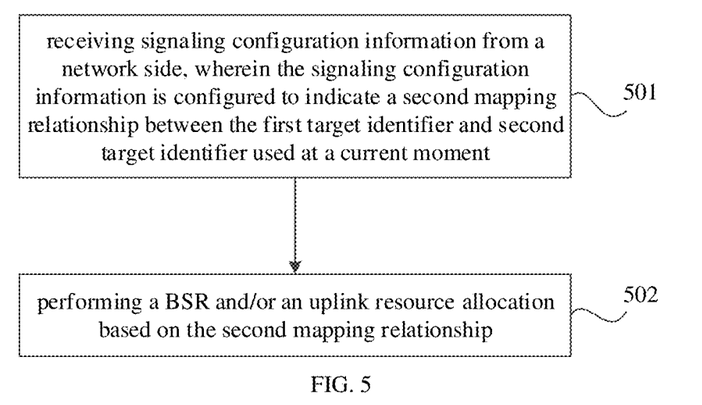
FIG. 5 is a flowchart illustrating a method for resource configuration according to a fifth embodiment of the disclosure.

In some embodiments, when one first target identifier corresponds to a plurality of second target identifiers, as illustrated in FIG. 5, the method for resource configuration further includes step 501 and step 502.

At step 501, a signaling from a network side is received. The signaling is configured to indicate a second mapping relationship between the first target identifier and the second target identifier used at a current moment.

In some examples, based on that the signaling used by the network side is the RRC signaling, and the first target identifier corresponds to the plurality of second target identifiers, the terminal device receives a MAC signaling or a physical layer signaling from the network side. The MAC signaling or the physical layer signaling is configured to indicate the second mapping relationship between the first target identifier and the second target identifier used at the current moment.

In some examples, based on that the signaling used by the network side is the MAC signaling, and the first target identifier corresponds to the plurality of second target identifiers, the terminal device receives a physical layer signaling from the network side. The physical layer signaling is configured to indicate the second mapping relationship between the first target identifier and the second target identifier used at the current moment. In the example, the network side further indicates the second mapping relationship between the first target identifier and the second target identifier used at the current moment via the physical layer signaling.

At step 502, a BSR and/or an uplink resource allocation is performed based on the second mapping relationship.

It may be understood that the second mapping relationship includes the first target identifier and the second target identifier that are needed in a multi-connection scenario.

Therefore, the BSR and/or the uplink resource allocation may be performed based on the second mapping relationship.

In order to understand how to indicate the second mapping relationship between the first target identifier and the second target identifier used at the current moment more clearly, it is illustrated in combination with specific scenarios.

Scenario One:

In the scenario, as illustrated in Table 14, the first mapping relationship includes the corresponding relationship between the LCID and the cell type identifier.

TABLE 14

| first target identifier | second target identifier |
|---|---|
| . . . | . . . |
| LCID = 5 | terrestrial cell, satellite cell |

In the example, for LCID=5, two ways for determining the second mapping relationship corresponding to LCID=5 may be adopted:

In a first way, whether data of the LCID are reported to the terrestrial cell or the satellite cell is selected based on a UE implementation, i.e., the terminal device selects whether LCID=5 corresponds to the terrestrial cell or the satellite cell.

In a second way, the network device further indicates the second mapping relationship between the first target identifier and the second target identifier used at the current moment via a MAC signaling or a physical layer signaling, and the terminal device determines whether to report the data of the LCID to the terrestrial cell or the satellite cell based on the second mapping relationship.

Scenario Two:

In the scenario, as illustrated in Table 15, the first mapping relationship includes the corresponding relationship between the LCID and the cell identifier list.

TABLE 15

| first target identifier | second target identifier |
|---|---|
| . . . | . . . |
| LCID = 5 | Cell list 1 {Cell 3, Cell 4}; Cell list 2 { Cell 1, Cell 2} |

In the example, for LCID=5, two ways for determining the second mapping relationship corresponding to LCID=5 may be adopted:

In a first way, whether data of the LCID are reported to a cell corresponding to which cell identifier list is selected based on a UE implementation, i.e., the terminal device selects whether LCID=5 corresponds to the cell list 1 or the cell list 2.

In a second way, the network device further indicates the second mapping relationship between the first target identifier and the second target identifier used at the current moment via a MAC signaling or a physical layer signaling, and the terminal device determines whether to report the data of the LCID to the cell corresponding to the cell list 1 or the cell corresponding to the cell list 2 based on the second mapping relationship.

Scenario Three:

In the scenario, as illustrated in Table 16, the first mapping relationship includes the corresponding relationship between the QoS parameter identifier and the cell type identifier.

TABLE 16

| first target identifier | second target identifier |
|---|---|
| . . . | . . . |
| 5QI = 5, 7 | terrestrial cell, satellite cell |

In the embodiments, for 5QI=5, 7, two ways for determining the second mapping relationship corresponding to 5QI=5, 7 may be adopted:

In a first way, whether data of 5QI=5, 7 are reported to the terrestrial cell or the satellite cell is selected based on a UE implementation, i.e., the terminal device selects whether the parameter identifier with 5QI=5, 7 correspond to the terrestrial cell or the satellite cell.

In a second way, the network device further indicates the second mapping relationship between the first target identifier and the second target identifier used at the current moment via a MAC signaling or a physical layer signaling, and the terminal device determines whether to report the data of 5QI=5, 7 to the terrestrial cell or the satellite cell based on the second mapping relationship.

Scenario Four:

In the scenario, as illustrated in Table 17, the first mapping relationship includes the corresponding relationship between the QoS parameter identifier and the cell identifier list.

TABLE 17

| first target identifier | second target identifier |
|---|---|
| . . . | . . . |
| 5QI = 5, 7 | Cell list 1 {Cell 3, Cell 4}; Cell list 2 { Cell 1, Cell 2} |

In the embodiments, for 5QI=5, 7, two ways for determining the second mapping relationship corresponding to 5QI=5, 7 may be adopted:

In a first way, whether data of 5QI=5, 7 are reported to a cell corresponding to which cell identifier list is selected based on a UE implementation, i.e., the terminal device selects whether 5QI=5, 7 corresponds to the cell list 1 or the cell list 2.

In a second way, the network device further indicates the second mapping relationship between the first target identifier and the second target identifier used at the current moment via a MAC signaling or a physical layer signaling, and the terminal device determines whether to report data of 5QI=5, 7 to the cell corresponding to the cell list 1 or the cell corresponding to the cell list 2 based on the second mapping relationship.

Scenario Five:

In the scenario, as illustrated in Table 18, the first mapping relationship includes the corresponding relationship between the bearer identifier and the cell type identifier.

TABLE 18

| first target identifier | second target identifier |
|---|---|
| . . . | . . . |
| bearer identifier = 5 | terrestrial cell, terrestrial cell |

In the embodiments, for bearer identifier=5, two ways for determining the second mapping relationship corresponding to bearer identifier=5 may be adopted:

In a first way, whether data of identifier=5 are reported to the terrestrial cell or the satellite cell is selected based on a UE implementation, i.e., the terminal device selects whether bearer identifier=5 corresponds to the terrestrial cell or the satellite cell.

In a second way, the network device further indicates the second mapping relationship between the first target identifier and the second target identifier used at the current moment via a MAC signaling or a physical layer signaling, and the terminal device determines whether to report the data of bearer identifier=5 to the terrestrial cell or the satellite cell based on the second mapping relationship.

Scenario six: In the scenario, as illustrated in Table 19, the first mapping relationship includes the corresponding relationship between the bearer identifier and the cell identifier list. In the embodiments, each cell identifier list is a list of a plurality of cell identifiers, and includes one or more cell identifiers that may be used by the bearer identifier.

TABLE 19

| first target identifier | second target identifier |
|---|---|
| . . . | . . . |
| bearer identifier = 5 | Cell list 1 { Cell 3, Cell 4}; Cell list 2 { Cell 1, Cell 2} |

In the embodiments, for bearer identifier=5, two ways for determining the second mapping relationship corresponding to bearer identifier=5 may be adopted:

In a first way, whether data of bearer identifier=5 are reported to a cell corresponding to which cell identifier list is selected based on a UE implementation, i.e., the terminal device selects whether bearer identifier=5 corresponds to the cell list 1 or the cell list 2.

In a second way, the network device further indicates the second mapping relationship between the first target identifier and the second target identifier used at the current moment via a MAC signaling or a physical layer signaling, and the terminal device determines whether to report data of bearer identifier=5 to the cell corresponding to the cell list 1 or the cell corresponding to the cell list 2 based on the second mapping relationship.

In summary, in the method for resource configuration in embodiments of the disclosure, the first target identifier based on the first mapping relationship corresponds to the plurality of second target identifiers simultaneously. The method for resource configuration may further indicate the second mapping relationship between the first target identifier and the second target identifier used at the current moment based on related configuration information, thereby ensuring the flexibility and practicality of resource allocation in a connection scenario.

Figure 6:
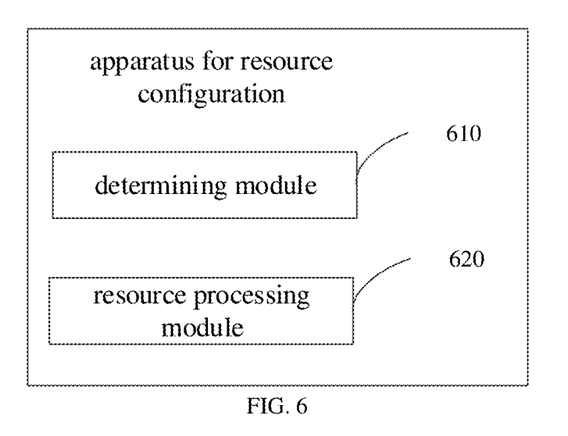
FIG. 6 is a block diagram illustrating an apparatus for resource configuration according to a sixth embodiment of the disclosure.

In order to implement the above embodiments, an apparatus for resource configuration is further provided in the disclosure. FIG. 6 is a block diagram illustrating an apparatus for resource configuration according to an embodiment of the disclosure. As illustrated in FIG. 6, the apparatus for resource configuration includes a determining module 610 and a resource processing module 620.

The determining module 610 is configured to determine a first mapping relationship between a first target identifier and a second target identifier. The first target identifier includes at least one of: a QoS parameter identifier, a logical channel identifier or a bearer identifier. The second target identifier includes at least one of: a cell type identifier or a cell identifier list.

The resource processing module 620 is configured to perform a BSR and/or an uplink resource allocation based on the first mapping relationship.

In an embodiment of the disclosure, the first target identifier includes at least one of: a QoS parameter identifier, a logical channel identifier or a bearer identifier.

In an embodiment of the disclosure, the second target identifier includes at least one of: a cell type identifier or a cell identifier list.

In an embodiment of the disclosure, the cell type identifier includes at least one of: a terrestrial cell, a satellite cell, an LEO satellite cell, an MEO satellite cell, a GEO satellite cell, an HEO satellite cell or a UAS platform cell.

In an embodiment of the disclosure, the determining module 610 is specifically configured to determine the first mapping relationship between the first target identifier and the second target identifier based on a preset protocol.

In an embodiment of the disclosure, the determining module 610 is specifically configured to receive an RRC signaling or an MAC signaling from a network side, in which the RRC signaling or the MAC signaling includes the first target identifier and the second target identifier corresponding to the first target identifier.

In an embodiment of the disclosure, the determining module 610 is specifically configured to receive a physical layer signaling from a network side, in which the physical layer signaling includes resource allocation information carrying the second target identifier and the first target identifier corresponding to the resource allocation information.

Figure 7:
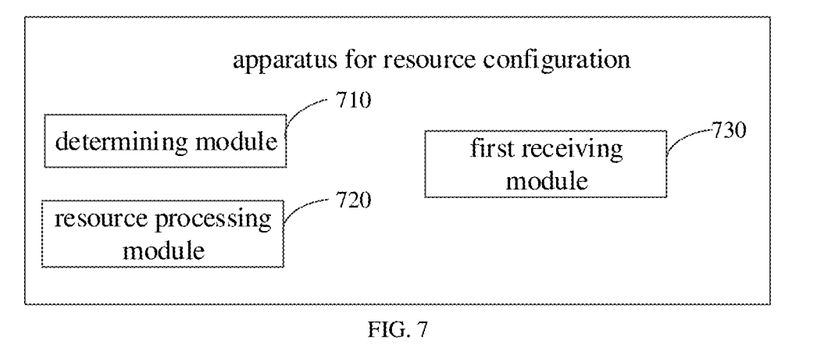
FIG. 7 is a block diagram illustrating an apparatus for resource configuration according to a seventh embodiment of the disclosure.

In an embodiment of the disclosure, based on that the RRC signaling is used by the network side and the first target identifier corresponds to a plurality of the second target identifiers, as illustrated in FIG. 7, the apparatus for resource configuration includes a determining module 710, a resource processing module 720 and a first receiving module 730.

The first receiving module 730 is configured to receive a MAC signaling or a physical layer signaling from the network side, in which the MAC signaling or the physical layer signaling is configured to indicate a second mapping relationship between the first target identifier and the second target identifier used at a current moment.

The determining module 710 is configured to determine the second mapping relationship between the first target identifier and the second target identifier used at the current moment.

The resource processing module 720 is further configured to perform a BSR and/or an uplink resource allocation based on the second mapping relationship.

Figure 8:
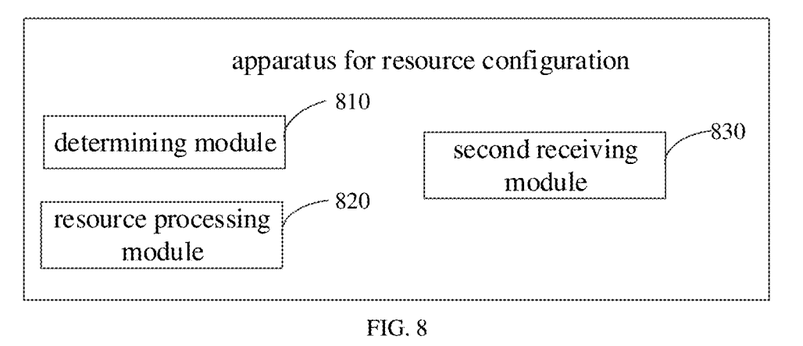
FIG. 8 is a block diagram illustrating an apparatus for resource configuration according to an eighth embodiment of the disclosure.

In an embodiment of the disclosure, based on that the MAC signaling is used by the network side and the first target identifier corresponds to a plurality of the second target identifiers, as illustrated in FIG. 8, the apparatus for resource configuration includes a determining module 810, a resource processing module 820 and a second receiving module 830.

The second the receiving module 830 is configured to receive a physical layer signaling from the network side, in which the physical layer signaling is configured to indicate a second mapping relationship between the first target identifier and the second target identifier used at a current moment.

The determining module 810 is configured to determine the second mapping relationship between the first target identifier and the second target identifier used at the current moment.

The resource processing module 820 is further configured to perform a BSR and/or an uplink resource allocation based on the second mapping relationship.

It should be noted that, division of units in embodiments of the disclosure is illustrative and only a logical function division. There may be another division manner in the actual implementation. In addition, functional units in various embodiments of the disclosure may be integrated in a processing unit, or may be physically existed separately, or two or more units may be integrated in one unit. The above integrated unit may be implemented in the form of hardware or in the form of software functional unit.

The integrated units may be stored in a processor-readable storage medium if implemented as software functional units and sold or used as stand-alone products. On the basis, the technical solution of the disclosure in nature or the part that contributes to the related art or the whole or part of the technical solution can be implemented in the form of software products. The computer software product is stored in a storage medium and includes instructions used to cause a computer device (which may be a personal computer, a server, or a network-side device) or a processor to perform all or part of the steps of the method of each embodiment of the disclosure. The above-mentioned storage medium includes: a U disk, a portable hard disk, a Read-Only Memory (ROM), a Random Access Memory (RAM), a magnetic disk or an optical disc and other mediums for storing program codes.

It needs to be noted that, the apparatus for resource configuration provided in embodiments of the disclosure may implement all method steps achieved by the method embodiments, and may achieve the same technical effects, and the same part as the method embodiments and the beneficial effects are not repeated in embodiments of the disclosure.

Figure 9:
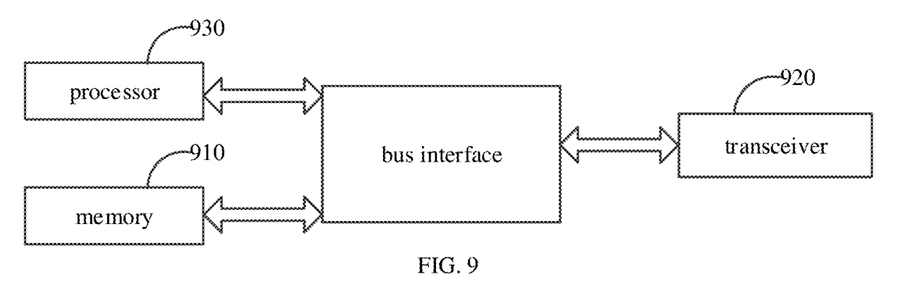
FIG. 9 is a block diagram illustrating a terminal device configured to achieve a method for resource configuration in embodiments of the disclosure.

In order to achieve the above embodiments, a terminal device is further provided in the disclosure. As illustrated in FIG. 9, the terminal device includes: a memory 910, a transceiver 920 and a processor 930. The transceiver 920 is configured to transmit and receive data under a control of the processor 930.

In FIG. 9, a bus architecture may include any number of interconnected buses and bridges, and specifically link various circuits including one or more processors represented by the processor 930 and memories represented by the memory 910. The bus architecture may further link various other circuits such as peripheral equipments, voltage regulators and power management circuits, which are well known in the art, which will not be further described herein. The bus interface provides an interface. The transceiver 920 may be a plurality of elements, i.e., include a transmitter and a receiver, and units for communicating with various other apparatuses on transmission media. The transmission media include a wireless channel, a wired channel, an optic cable and other transmission media. The processor 930 is in charge of managing the bus architecture and general processings, and the memory 910 may store data used by processor 930 in performing operations.

The processor 930 may be a central processing unit (CPU), an application specific integrated circuit (CPU), a field-programmable gate array (FPGA) or a complex programmable logic device (CPLD). The processor 910 may also adopt a multi-core architecture.

The processor is configured to perform any one of the methods for resource configuration provided in embodiments of the disclosure based on an acquired executable instruction by calling a computer program stored in a memory. The processor and the memory may also be physically separated.

In embodiments of the disclosure, the processor is configured to read the computer program stored in the memory and perform operations of: determining a first mapping relationship between a first target identifier and a second target identifier, in which the first target identifier includes at least one of: a QoS parameter identifier, a logical channel identifier or a bearer identifier; and the second target identifier includes at least one of: a cell type identifier or a cell identifier list; and performing a BSR and/or an uplink resource allocation based on the first mapping relationship.

In different application scenarios, there may be one or more corresponding relationships between the first target identifier and the second target identifier included in the first mapping relationship:

(1) The first mapping relationship includes a corresponding relationship between the QoS parameter identifier and the cell type identifier. The first mapping relationship is as illustrated in Table 2, in which 5QI in Table 2 is the QoS parameter identifier, and the terrestrial cell and the satellite cell are cell types.

(2) The first mapping relationship includes a corresponding relationship between the QoS parameter identifier and the cell identifier list. The first mapping relationship is as illustrated in Table 3, in which 5QI is the QoS parameter identifier, and the cell list is the cell identifier list.

(3) The first mapping relationship includes a corresponding relationship between the logical channel identifier (LCID) and the cell type identifier. The first mapping relationship is as illustrated in Table 4, in which LCID is the logical channel identifier, and the terrestrial cell and the satellite cell are cell types.

(4) The first mapping relationship includes a corresponding relationship between the logical channel identifier (LCID) and the cell identifier list. The first mapping relationship is as illustrated in Table 5, in which LCID is the logical channel identifier, and the cell list is the cell identifier list.

(5) The first mapping relationship includes a corresponding relationship between the bearer identifier and the cell type identifier. The first mapping relationship is as illustrated in Table 6, in which the terrestrial cell and the satellite cell are cell types.

(6) The first mapping relationship includes a corresponding relationship between the bearer identifier and the cell identifier list. The first mapping relationship is as illustrated in Table 7, in which the cell list is the cell identifier list.

It may be understood that the first mapping relationship includes the first target identifier and the second target identifier that are needed in the multi-connection scenario. Therefore, the BSR and/or the uplink resource allocation may be performed based on the first mapping relationship.

In combination with a specific scenario, the BSR and/or the uplink resource allocation is performed based on the first mapping relationship.

Scenario One:

In the scenario, the BSR and/or the uplink resource allocation is performed based on the first mapping relationship. As illustrated in Table. 8, the first mapping relationship includes the corresponding relationship between the LCID and the cell type identifier.

In the embodiments, the first target identifier is the LCID, and the second target identifier is the cell type identifier, in which a cell type 1 is the terrestrial cell, and a cell type 2 is the satellite cell.

In the embodiments, for logical channel identifiers with LCID=1 and LCID=4, their BSRs are reported to the terrestrial cell by taking the LCG as a unit; and for logical channel identifiers with LCID=2 and LCID=3, their BSRs are reported to the satellite cell by taking the LCG as a unit. In addition, the terminal device also needs to consider the first mapping relationship between the first target identifier and the second target identifier when performing the uplink resource allocation. In detail, logical channel identifiers with LCID=1 and LCID=4 are only allowed to use uplink resources allocated by the terrestrial cell; and logical channel identifiers with LCID=2 and LCID=3 are only allowed to use uplink resources allocated by the satellite cell.

Scenario Two:

In the scenario, the BSR and/or the uplink resource allocation is performed based on the first mapping relationship. As illustrated in Table 9, the first mapping relationship includes the corresponding relationship between the LCID and the cell identifier list.

In the embodiments, the first target identifier is the LCID, and the second target identifier is the cell identifier list, in which each cell identifier list may be a list of a plurality of cell identifiers, and each cell identifier list includes one or more cell identifiers that may be used by the LCID.

In the embodiments, for logical channel identifiers with LCID=1 and LCID=4, their BSRs are reported to a cell corresponding to the cell list 1 by taking the LCG as a unit; and for logical channel identifiers with LCID=2 and LCID=3, their BSRs are reported to a cell corresponding to the cell list 2 by taking the LCG as a unit. In addition, the terminal device needs to consider the first mapping relationship between the first target identifier and the second target identifier when performing the uplink resource allocation. In detail, logical channel identifiers with LCID=1 and LCID=4 are only allowed to use uplink resources allocated by a cell in the cell list 1; and logical channel identifiers with LCID=2 and LCID=3 are only allowed to use uplink resources allocated by a cell in the cell list 2.

Scenario Three:

In the scenario, the BSR and/or the uplink resource allocation is performed based on the first mapping relationship. As illustrated in Table 10, the first mapping relationship includes the corresponding relationship between the QoS parameter identifier and the cell type identifier.

In the embodiments, the first target identifier is the QoS parameter identifier, and the second target identifier is the cell type identifier, in which a cell type 1 is the terrestrial cell, and a cell type 2 is the satellite cell.

In the example, for the QoS parameter identifier with 5QI=1, 2, 3, its BSR may be reported to the terrestrial cell; and for the QoS parameter identifier with 5QI=4, 6, its BSR may be reported to the satellite cell. In addition, the terminal device needs to consider the first mapping relationship between the first target identifier and the second target identifier when performing the uplink resource allocation. In detail, the QoS parameter identifier with 5QI=1, 2, 3 is only allowed to use uplink resources allocated by the terrestrial cell; the logical channel identifier with 5QI=4, 6 is only allowed to use uplink resources allocated by the satellite cell.

Scenario Four:

In the scenario, the BSR and/or the uplink resource allocation is performed based on the first mapping relationship. As illustrated in Table 11, the first mapping relationship includes the corresponding relationship between the QoS parameter identifier and the cell identifier list.

In the embodiments, the first target identifier is the QoS parameter identifier, and the second target identifier is the cell identifier list. Each cell identifier list is a list of a plurality of cell identifiers, and includes cell identifiers that may be used by one or more of the LCIDs.

In the embodiments, for the QoS parameter identifier with 5QI=1, 2, 3, its BSR is reported to a cell corresponding to the cell list 1 by taking the LCG as a unit; for the QoS parameter identifier with 5QI=4, its BSR is reported to a cell corresponding to the cell list 2 by taking the LCG as a unit; and for the QoS parameter identifier with 5QI=6, its BSR is reported to a cell corresponding to the cell list 2 by taking the LCG as a unit. In addition, the terminal device needs to consider the first mapping relationship between the first target identifier and the second target identifier when performing the uplink resource allocation. In detail, the QoS parameter identifier with 5QI=1, 2, 3 is only allowed to use uplink resources allocated by a cell in the cell list 2; the QoS parameter identifier with 5QI=4 is only allowed to use uplink resources allocated by a cell in the cell list 2; and the QoS parameter identifier with 5QI=6 is only allowed to use uplink resources allocated by a cell in the cell list 2.

Scenario Five:

In the scenario, the BSR and/or the uplink resource allocation is performed based on the first mapping relationship. As illustrated in Table 12, the first mapping relationship includes the corresponding relationship between the bearer identifier and the cell type identifier.

In the embodiments, the first target identifier is the bearer identifier, and the second target identifier is the cell type identifier. A cell type 1 is the terrestrial cell, and a cell type 2 is the satellite cell.

In the embodiments, for bearer identifiers with bearer identifier=1 and bearer identifier=4, their BSRs are reported to the terrestrial cell by taking the LCG as a unit; and for bearer identifiers with bearer identifier=2 and bearer identifier=3, their BSRs are reported to the satellite cell by taking the LCG as a unit. In addition, the terminal needs to consider the first mapping relationship between the first target identifier and the second target identifier when performing the uplink resource allocation. In detail, bearer identifiers with bearer identifier=1 and bearer identifier=4 are only allowed to use uplink resources allocated by the terrestrial cell; and bearer identifiers with bearer identifier=2 and bearer identifier=3 are only allowed to use uplink resources allocated by the satellite cell.

Scenario Six:

In the scenario, the BSR and/or an uplink resource allocation is performed based on the first mapping relationship.

As illustrated in Table 13, the first mapping relationship includes the corresponding relationship between the bearer identifier and the cell identifier list.

In the embodiments, the first target identifier is the bearer identifier, and the second target identifier includes the cell identifier list. Each cell identifier list is a list of a plurality of cell identifiers, and includes one or more cell identifiers that may be used by the LCID.

In the embodiments, for bearer identifiers with bearer identifier=1 and bearer identifier=4, their BSRs are reported to a cell corresponding to the cell list 1 by taking the LCG as a unit; and for bearer identifiers with bearer identifier=2 and bearer identifier=3, their BSRs are reported to a cell corresponding to the cell list 2 by taking the LCG as a unit. In addition, the terminal device needs to consider the first mapping relationship between the first target identifier and the second target identifier when performing the uplink resource allocation. In detail, bearer identifiers with bearer identifier=1 and bearer identifier=4 are only allowed to use uplink resources allocated by a cell in the cell list 1; and bearer identifiers with bearer identifier=2 and bearer identifier=3 are only allowed to use uplink resources allocated by a cell in the cell list 2.

In summary, in the method for resource configuration in embodiments of the disclosure, the terminal device may determine the first mapping relationship between the first target identifier and the second target identifier; and perform the BSR and/or the uplink resource allocation according to the first mapping relationship. In the method, it may be ensured that different services of the terminal may be transmitted by selecting an appropriate cell type during radio transmission, thereby ensuring the QoS of the service better and improving the user experience.

In different application scenarios, ways for determining by the processor the first mapping relationship between the first target identifier and the second target identifier are different, and are illustrated below in combination with different examples:

Example One

In the example, the processor determines the first mapping relationship between the first target identifier and the second target identifier based on a preset protocol.

Example Two

In the example, the processor receives an RRC signaling or an MAC signaling from a network side. The RRC signaling or the MAC signaling includes the first target identifier and the second target identifier corresponding to the first target identifier.

Example Three

In the example, the processor receives a physical layer signaling from a network side. The physical layer signaling includes resource allocation information carrying the second target identifier and the first target identifier corresponding to the resource allocation information. For example, a LCID or a bearer identifier corresponding to the resource allocation information.

Based on the above embodiments, in an actual execution process, there may be a scenario where a single first target identifier corresponds to a plurality of second target identifiers in the first mapping relationship. In order to ensure the normal communication, the processor needs to further determine the corresponding relationship between the first target identifier and the second target identifier in the one-to-many scenario.

In some examples, based on that the signaling used by the network side is the RRC signaling, the processor receives a MAC signaling or a physical layer signaling from the network side. The MAC signaling or the physical layer signaling is configured to indicate a second mapping relationship between the first target identifier and second target identifier used at a current moment.

In another examples, based on that the signaling used by the network side is the MAC signaling, and the first target identifier corresponds to the plurality of second target identifiers, the processor receives a physical layer signaling from the network side. The physical layer signaling is configured to indicate a second mapping relationship between the first target identifier and second target identifier used at a current moment.

It may be understood that the second mapping relationship includes the first target identifier and the second target identifier that are needed in a multi-connection scenario.

Therefore, a BSR and/or an uplink resource allocation may be performed based on the second mapping relationship.

In order to understand how to indicate the second mapping relationship between the first target identifier and the second target identifier used at the current moment more clearly, it is illustrated below in combination with specific scenarios:

Scenario One:

In the scenario, as illustrated in Table 14, the first mapping relationship includes the corresponding relationship between the LCID and the cell type identifier.

In the example, for LCID=5, two ways for determining the second mapping relationship corresponding to LCID=5 may be adopted:

In a first way, whether data of the LCID are reported to the terrestrial cell or the satellite cell is selected based on a UE implementation, i.e., the terminal device selects whether LCID=5 corresponds to the terrestrial cell or the satellite cell.

In a second way, the network device further indicates the second mapping relationship between the first target identifier and the second target identifier used at the current moment via a MAC signaling or a physical layer signaling, and the terminal device determines whether to report data of the LCID to the terrestrial cell or the satellite cell based on the second mapping relationship.

Scenario Two:

In the scenario, as illustrated in Table 15, the first mapping relationship includes the corresponding relationship between the LCID and the cell identifier list.

In the example, for LCID=5, two ways for determining the second mapping relationship corresponding to LCID=5 may be adopted:

In a first way, whether data of the LCID are reported to a cell corresponding to which cell identifier list is selected based on a UE implementation, i.e., the terminal device selects whether LCID=5 corresponds to the cell list 1 or the cell list 2.

In a second way, the network device further indicates the second mapping relationship between the first target identifier and the second target identifier used at the current moment via a MAC signaling or a physical layer signaling, and the terminal device determines whether to report the data of the LCID to the cell corresponding to the cell list 1 or the cell corresponding to the cell list 2 based on the second mapping relationship.

Scenario Three:

In the scenario, as illustrated in Table 16, the first mapping relationship includes the corresponding relationship between the QoS parameter identifier and the cell type identifier.

In the embodiments, for 5QI=5, 7, two ways for determining the second mapping relationship corresponding to 5QI=5, 7 may be adopted:

In a first way, whether data of 5QI=5, 7 are reported to the terrestrial cell or the satellite cell is selected based on a UE implementation, i.e., the terminal device selects whether the parameter identifier with 5QI=5, 7 correspond to the terrestrial cell or the satellite cell.

In a second way, the network device further indicates the second mapping relationship between the first target identifier and the second target identifier used at the current moment via a MAC signaling or a physical layer signaling, and the terminal device determines whether to report the data of 5QI=5, 7 to the terrestrial cell or the satellite cell based on the second mapping relationship.

Scenario Four:

In the scenario, as illustrated in Table 17, the first mapping relationship includes the corresponding relationship between the QoS parameter identifier and the cell identifier list.

In the embodiments, for 5QI=5, 7, two ways for determining the second mapping relationship corresponding to 5QI=5, 7 may be adopted:

In a first way, whether data of 5QI=5, 7 are reported to a cell corresponding to which cell identifier list is selected based on a UE implementation, i.e., the terminal device selects whether 5QI=5, 7 corresponds to the cell list 1 or the cell list 2.

In a second way, the network device further indicates the second mapping relationship between the first target identifier and the second target identifier used at the current moment via a MAC signaling or a physical layer signaling, and the terminal device determines whether to report data of 5QI=5, 7 to the cell corresponding to the cell list 1 or the cell corresponding to the cell list 2 based on the second mapping relationship.

Scenario Five:

In the scenario, as illustrated in Table 18, the first mapping relationship includes the corresponding relationship between the bearer identifier and the cell type identifier.

In the embodiments, for bearer identifier=5, two ways for determining the second mapping relationship corresponding to bearer identifier=5 may be adopted:

In a first way, whether data of identifier=5 are reported to the terrestrial cell or the satellite cell is selected based on a UE implementation, i.e., the terminal device selects whether bearer identifier=5 corresponds to the terrestrial cell or the satellite cell.

In a second way, the network device further indicates the second mapping relationship between the first target identifier and the second target identifier used at the current moment via a MAC signaling or a physical layer signaling, and the terminal device determines whether to report the data of bearer identifier=5 to the terrestrial cell or the satellite cell based on the second mapping relationship.

Scenario Six:

In the scenario, as illustrated in Table 19, the first mapping relationship includes the corresponding relationship between the bearer identifier and the cell identifier list.

In the embodiments, each cell identifier list is a list of a plurality of cell identifiers, and includes one or more cell identifiers that may be used by the bearer identifier.

In the embodiments, for bearer identifier=5, two ways for determining the second mapping relationship corresponding to bearer identifier=5 may be adopted:

In a first way, whether data of bearer identifier=5 are reported to a cell corresponding to which cell identifier list is selected based on a UE implementation, i.e., the terminal device selects whether bearer identifier=5 corresponds to the cell list 1 or the cell list 2.

In a second way, the network device further indicates the second mapping relationship between the first target identifier and the second target identifier used at the current moment via a MAC signaling or a physical layer signaling, and the terminal device determines whether to report data of bearer identifier=5 to the cell corresponding to the cell list 1 or the cell corresponding to the cell list 2 based on the second mapping relationship.

In summary, the processor in embodiments of the disclosure may ensure that different services of the terminal may be transmitted by selecting an appropriate cell type during radio transmission, thereby ensuring the QoS of the service better and improving the user experience.

In order to achieve the above embodiments, a processor-readable storage medium stored with a computer program is further proposed. The computer program is configured to cause a processor to perform the method for resource configuration as described in the above embodiments.

The above processor-readable storage medium may be any available medium or data storage device that the processor may access, including but not limited to a magnetic memory (e.g., a floppy disk, a hard disk, a magnetic tape, a magnetic optical disk (MO)), an optical memory (e.g., a CD, a DVD, a BD, a HVD), and a semiconductor memory (e.g., a ROM, an EPROM, an EEPROM, a non-volatile memory (a NAND a FLASH), a solid state drive (SSD)).

In order to achieve the above embodiments, a computer program product including a computer program code is further provided. When the computer program code is running on a computer, the method for resource configuration as described in the above embodiments is performed.

In order to achieve the above embodiments, a computer program including a computer program code is further provided. When the computer program code is running on a computer, the computer is caused to perform the method for resource configuration as described in the above embodiments.

Those skilled in the art should understand that the embodiments of the disclosure may provide a method, a system, or a computer program product. Therefore, the disclosure may provide the embodiment in the form of entire hardware, the embodiment in the form of entire software, or the embodiment in the form of software and hardware. Moreover, the disclosure may take the form of a computer program product implemented on one or more computer-usable storage mediums (including, but not limited to, a disk memory and an optical memory) that contain computer-usable program codes therein.

The disclosure is described with reference to the flowcharts and/or the block diagrams of the methods, the devices (systems), and the computer program products according to the embodiments of the disclosure. It is understood that each process and/or box in the flowchart and/or block diagram, and the combination of processes and/or boxes in the flowchart and/or the block diagram, may be implemented by the computer-executable instructions. These computer executable instructions may be provided to a processor of a general computer, a specialized computer, an embedded processor, or other programmable data processing device to produce a machine, such that the instructions executed by the processor of the computer or other programmable data processing device can produce a device for implementing the functions specified in one or more processes of the flowchart and/or one or more boxes of the block diagram.

These processor-executable instructions may also be stored in a processor-readable memory capable of directing a computer or other programmable data processing device to operate in a particular manner, such that the instructions stored in the processor-readable memory produce an article of manufacture including a command device. The command device implements the functions specified in one or more processes of the flowchart and/or one or more boxes of the block diagram.

These processor-executable instructions may also be loaded onto a computer or other programmable data processing device, such that a series of operational steps are performed on the computer or other programmable device to produce computer-implemented processing.

The instructions executed on the computer or other programmable device provide steps for implementing the functions specified in one or more processes of the flowchart and/or one or more boxes of the block diagram.

The embodiments of the disclosure are described as below with reference to the accompanying drawings, which include various details of embodiments of the disclosure to facilitate understanding, and should be considered as merely exemplary. Therefore, those skilled in the art should realize that various changes and modifications may be made to the embodiments described herein without departing from the scope and spirit of the disclosure. Similarly, for clarity and conciseness, descriptions of well-known functions and structures are omitted in the following descriptions.

All embodiments of the disclosure may be executed separately or in combination with other embodiments, and are deemed within a protection scope of the disclosure.

What is claimed is:

1. A method for resource configuration, performed by a terminal device, comprising:
   determining a first mapping relationship between a first target identifier and a second target identifier, wherein the first target identifier comprises at least one of: a Quality of Service (QoS) parameter identifier, a logical channel identifier or a bearer identifier; and the second target identifier comprises a cell type identifier; and
   performing a buffer status report (BSR) and/or an uplink resource allocation based on the first mapping relationship,
   wherein the cell type identifier comprises at least one of: a terrestrial cell, a satellite cell, a low earth orbit (LEO) satellite cell, a medium earth orbit (MEO) satellite cell, a geostationary earth orbit (GEO) satellite cell, a highly elliptical orbit (HEO) satellite cell or an unmanned aircraft systems (UAS) platform cell,
   wherein the terminal device simultaneously accesses at least two of the terrestrial cell, the satellite cell, the LEO satellite cell, the MEO satellite cell, the GEO satellite cell, the HEO satellite cell and the UAS platform cell.

2. The method according to claim 1, wherein determining the first mapping relationship between the first target identifier and the second target identifier comprises:

determining the first mapping relationship between the first target identifier and the second target identifier based on a preset protocol.

3. The method according to claim 1, wherein determining the first mapping relationship between the first target identifier and the second target identifier comprises:
receiving a radio resource control (RRC) signaling or a media access control (MAC) signaling from a network side, wherein the RRC signaling or the MAC signaling comprises the first target identifier and the second target identifier corresponding to the first target identifier.

4. The method according to claim 3, wherein based on that the RRC signaling is used by the network side and the first target identifier corresponds to a plurality of the second target identifiers, the method further comprises:
receiving a MAC signaling or a physical layer signaling from the network side, wherein the MAC signaling or the physical layer signaling is configured to indicate a second mapping relationship between the first target identifier and the second target identifier used at a current moment.

5. The method according to claim 3, wherein based on that the MAC signaling is used by the network side and the first target identifier corresponds to a plurality of the second target identifiers, the method further comprises:
receiving a physical layer signaling from the network side, wherein the physical layer signaling is configured to indicate a second mapping relationship between the first target identifier and the second target identifier used at a current moment.

6. The method according to claim 1, wherein determining the first mapping relationship between the first target identifier and the second target identifier comprises:
receiving a physical layer signaling from a network side, wherein the physical layer signaling comprises resource allocation information carrying the second target identifier and the first target identifier corresponding to the resource allocation information.

7. A terminal device, comprising
a memory configured to store a computer program;
a transceiver configured to transmit and receive data under a control of a processor; and
the processor configured to read the computer program stored in the memory and perform operations of:
determining a first mapping relationship between a first target identifier and a second target identifier, wherein the first target identifier comprises at least one of: a Quality of Service (QoS) parameter identifier, a logical channel identifier or a bearer identifier; and the second target identifier comprises a cell type identifier; and
performing a buffer status report (BSR) and/or an uplink resource allocation based on the first mapping relationship,
wherein the cell type identifier comprises at least one of:
a terrestrial cell, a satellite cell, a low earth orbit (LEO) satellite cell, a medium earth orbit (MEO) satellite cell, a geostationary earth orbit (GEO) satellite cell, a highly elliptical orbit (HEO) satellite cell or an unmanned aircraft systems (UAS) platform cell,
wherein the terminal device simultaneously accesses at least two of the terrestrial cell, the satellite cell, the LEO satellite cell, the MEO satellite cell, the GEO satellite cell the HEO satellite cell and the UAS platform cell.

8. The terminal device according to claim 7, wherein the processor is further configured to read the computer program stored in the memory and perform an operation of:
determining the first mapping relationship between the first target identifier and the second target identifier based on a preset protocol.

9. The terminal device according to claim 7, wherein the processor is further configured to read the computer program stored in the memory and perform an operation of:
receiving a radio resource control (RRC) signaling or a media access control (MAC) signaling from a network side, wherein the RRC signaling or the MAC signaling comprises the first target identifier and the second target identifier corresponding to the first target identifier.

10. The terminal device according to claim 9, wherein based on that the RRC signaling is used by the network side and the first target identifier corresponds to a plurality of the second target identifiers, the processor is further configured to read the computer program stored in the memory and perform an operation of:
receiving a MAC signaling or a physical layer signaling from the network side, wherein the MAC signaling or the physical layer signaling is configured to indicate a second mapping relationship between the first target identifier and the second target identifier used at a current moment.

11. The terminal device according to claim 9, wherein based on that the MAC signaling is used by the network side and the first target identifier corresponds to a plurality of the second target identifiers, the processor is further configured to read the computer program stored in the memory and perform an operation of:
receiving a physical layer signaling from the network side, wherein the physical layer signaling is configured to indicate a second mapping relationship between the first target identifier and the second target identifier used at a current moment.

12. The terminal device according to claim 7, wherein the processor is further configured to read the computer program stored in the memory and perform an operation of:
receiving a physical layer signaling from a network side, wherein the physical layer signaling comprises resource allocation information carrying the second target identifier and the first target identifier corresponding to the resource allocation information.

13. A non-transitory processor-readable storage medium stored with a computer program, wherein the computer program is configured to cause a processor of a terminal device to perform a method for resource configuration, the method comprising:
determining a first mapping relationship between a first target identifier and a second target identifier, wherein the first target identifier comprises at least one of: a Quality of Service (QoS) parameter identifier, a logical channel identifier or a bearer identifier; and the second target identifier comprises a cell type identifier; and
performing a buffer status report (BSR) and/or an uplink resource allocation based on the first mapping relationship,
wherein the cell type identifier comprises at least one of:
a terrestrial cell, a satellite cell, a low earth orbit (LEO) satellite cell, a medium earth orbit (MEO) satellite cell, a geostationary earth orbit (GEO) satellite cell, a highly elliptical orbit (HEO) satellite cell or an unmanned aircraft systems (UAS) platform cell,
wherein the terminal device simultaneously accesses at least two of the terrestrial cell, the satellite cell, the LEO satellite cell, the MEO satellite cell, the GEO satellite cell, the HEO satellite cell and the UAS platform cell.

14. The non-transitory processor-readable storage medium according to claim 13, wherein determining the first mapping relationship between the first target identifier and the second target identifier comprises:

determining the first mapping relationship between the first target identifier and the second target identifier based on a preset protocol.

15. The non-transitory processor-readable storage medium according to claim 13, wherein determining the first mapping relationship between the first target identifier and the second target identifier comprises:

receiving a radio resource control (RRC) signaling or a media access control (MAC) signaling from a network side, wherein the RRC signaling or the MAC signaling comprises the first target identifier and the second target identifier corresponding to the first target identifier.

16. The non-transitory processor-readable storage medium according to claim 15, wherein based on that the RRC signaling is used by the network side and the first target identifier corresponds to a plurality of the second target identifiers, the method further comprises:

receiving a MAC signaling or a physical layer signaling from the network side, wherein the MAC signaling or the physical layer signaling is configured to indicate a second mapping relationship between the first target identifier and the second target identifier used at a current moment; or wherein based on that the MAC signaling is used by the network side and the first target identifier corresponds to a plurality of the second target identifiers, the method further comprises:

receiving a physical layer signaling from the network side, wherein the physical layer signaling is configured to indicate a second mapping relationship between the first target identifier and the second target identifier used at a current moment.

17. The non-transitory processor-readable storage medium according to claim 13, wherein determining the first mapping relationship between the first target identifier and the second target identifier comprises:

receiving a physical layer signaling from a network side, wherein the physical layer signaling comprises resource allocation information carrying the second target identifier and the first target identifier corresponding to the resource allocation information.

\* \* \* \* \*